Oct. 19, 1971  L. W. COFER  3,613,345
CROP-HANDLING MEANS AND STRIPPER THEREFOR
Filed Sept. 30, 1969
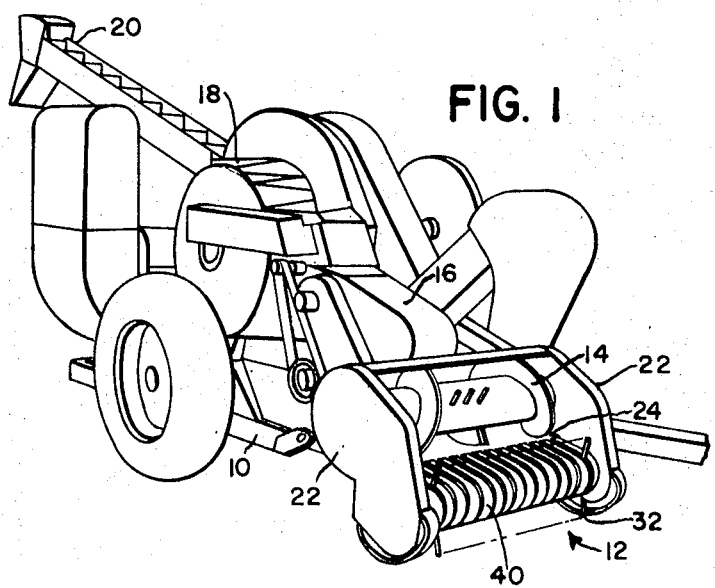
FIG. 1
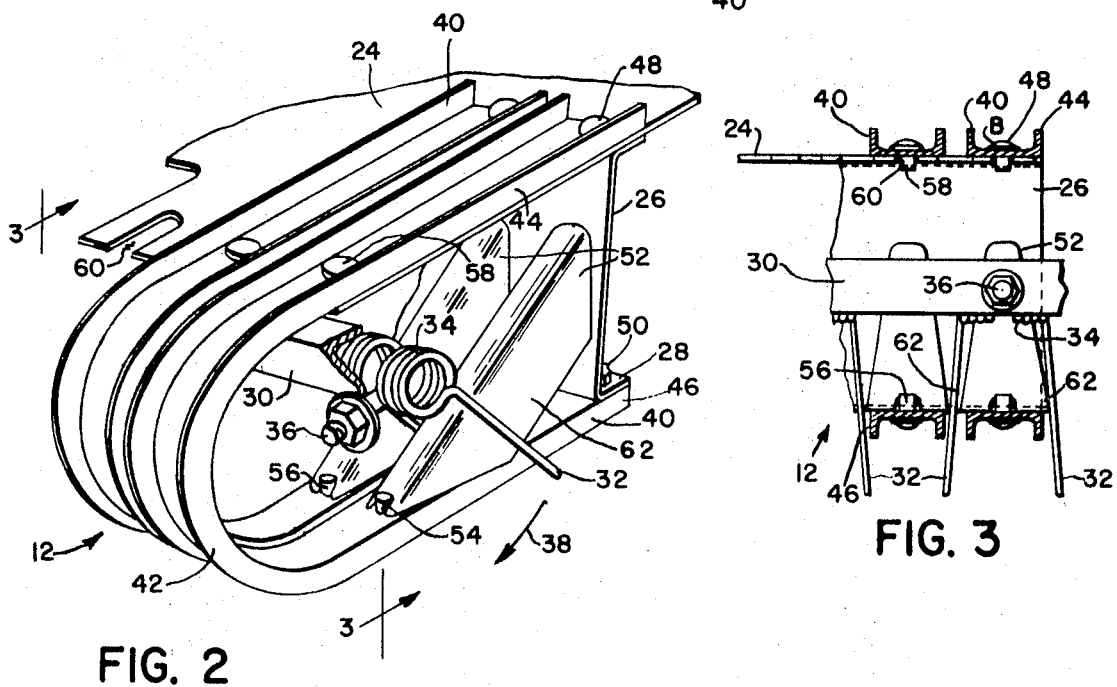
FIG. 2
FIG. 3
INVENTOR.
L.W. COFER
BY *John M Nolan*
ATTORNEY United States Patent Office 3,613,345
Patented Oct. 19, 1971

3,613,345
CROP-HANDLING MEANS AND STRIPPER THEREFOR
Larry Wilson Cofer, Ottumwa, Iowa, assignor to Deere & Company, Moline, Ill.
Filed Sept. 30, 1969, Ser. No. 862,349
Int. Cl. A01d 89/00
U.S. Cl. 56—364
4 Claims

ABSTRACT OF THE DISCLOSURE

A crop-handling device, especially for use as the crop pick-up for an agricultural machine and having improved crop strippers and reversible mounting means therefor.

BACKGROUND OF THE INVENTION

This invention relates to crop-handling devices in the form of reels equipped with tines or finger such as are well-known in the agricultural field, especially as crop pick-ups for mounting on mobile frames adapted to advance over a field on which previously harvested crops are lying and which devices function to pick up such crops for advance or delivery to crop-treating means such as baling chambers, etc. A typical device includes a plurality of tine bars arranged to orbit about a central axis so that the fingers or tines sweep forwardly and upwardly and then rearwardly and downwardly, passing through the fore-and-aft spaces or slots among strippers so that the picked-up crop is not carried around with the reel. One of the basic problems encountered in the use of these devices is that the fingers often become bent laterally and have a tendency to catch or hang up on the strippers, becoming further bent or broken and at the same time causing excessive wear on the strippers. For this reason, it is desirable that the strippers be easily removed and replaced.

SUMMARY OF THE INVENTION

The novel structure provided here involves the provision of easily removable strippers which are specially designed so as to be reversible and replaceable in order to present new wear surfaces. Also provided is a quick and easy mounting that reduces the number of fastening means to a substantially minimum. Further, the mount for the strippers includes a brace that not only adds strength to the structure but includes diverging side walls that function to properly displace bent tines or fingers and thus avoid damage to the strippers or fingers.

BRIEF DESCRIPTION OF THE DRAWINGS

FIG. 1 is a perspective of a representative environment for the inventive structure;
FIG. 2 is an enlarged fragmentary perspective, with portions broken away, showing the basic structure; and
FIG. 3 is a section substantially on the line 3—3 of FIG. 2.

DESCRIPTION OF A PREFERRED EMBODIMENT

The machine chosen for illustration is a so-called hay cuber having a mobile fore-and-aft frame 10 at the front end of which is a typical pickup device or crop-handling means 12 in the form of a finger reel delivering upwardly and rearwardly to a narrowing auger 14, from which the crops, previously harvested, are delivered through a feed housing 16 to a cubing or wafering die means 18. The finished cubes or wafers are ultimately transferred by a wagon elevator 20 to a trailing wagon (not shown). In the illustrative example, as in most like machines, the length of the reel or device 12 is transverse to the path of travel of the machine, the reel being carried in any suitable manner, not important here, between side sheets 22 which act in conjunction with a forwardly extending deck 24 and other structure as a support for the reel.

In the above arrangement, the deck affords a forward extension of the floor for the auger 14 and at its rear transverse portion is rigidly joined to a depending rear wall 26 which has a rearwardly turned lower portion in the form of a flange 28.

A fundamental part of the reel is an elongated tine or finger bar 30 on which is mounted a plurality of radially extending axially spaced apart tines or fingers 32, here typically arranged in pairs projecting from a coil 34 mounted to the bar 30 in normal fashion by means 36. The path of travel of the tines is indicated by the arrow 38 so that each set of tines travels in an orbital path to sweep forwardly and upwardly and then further upwardly and rearwardly and downwardly, which is the result whether the tines be mounted on a central rotating shaft or on shafts arranged to travel via a closed cam track or the like, the tines passing through the fore-and-aft spaces between a plurality of strippers 40, as is customary, so that as the tines move downwardly in their orbits the crop is stripped therefrom and continues over the deck or floor 24. Each stripper is of channel-shaped cross-section as is usual and embraces the reel or device 12 about the front half thereof in customary fashion.

Each stripper differs however from prior art strippers, having a U shape of symmetrical configuration so as to be reversible, and includes a reel-embracing front bight 42 and upper and lower fore-and-aft legs 44 and 46 which, in this case, are parallel to each other. The upper leg overlies the proximate portion of the deck 24 and is secured thereto at its rear terminal end by rear removable fasteners such as bolts and nuts 48. The rear end of the lower leg is secured to the rear wall flange by removable fasteners also in the form of bolts and nuts 50.

A brace 52 extends upwardly and rearwardly from the uppe face of the lower leg of each stripper, the rearward end of each brace being rigidly affixed to the front of the rear wall 26. The forward end of each brace is connected to the respective stripper by a forward separable connector including a slot 54 in the brace and a pin 56 in the leg 46. A similar separable connector is provided between a forepart of the deck 24 and the stripper upper leg 44 and includes a pin 58 in the former and a slot 60 in the latter.

Each stripper may be easily removed by removing the rear bolts and nuts 48 and 50, shifting the stripper forward to separate the pin and slot connectors 54–56 and 58–60. Since each stripper is symmetrical, as are the connectors and fasteners, the stripper may be reversed top to bottom and just as easily reinstalled to present new wear surfaces. Strippers may also be exchanged in side-by-side relation, because they are all similar.

In order to prevent laterally bent tines from catching or hanging up on the lower legs of the strippers, the braces are designed of material more wear-resistant than the strippers and have downwardly and laterally outwardly diverging sides or walls that respectively overhang opposite fore-and-aft sides of the stripper lower leg at 62 (FIG. 3), assuring that bent fingers will be positively displaced laterally outwardly. Each brace may be of inverted U-shaped construction.

I claim:
1. A crop-handling device, especially for use as the crop pick-up for an agricultural machine adapted to advance over a field, including a support, a reel transverse to the line of advance and journaled on and ahead of the support and carrying radially extending axially spaced fingers and a plurality of crop strippers associated with the reel and in spaced apart side-by-side relation and between which the fingers travel, characterized in that the support includes an upper deck and a rear wall below the deck and behind the reel, each stripper is of U shape and having a forward bight around the front portion of the reel, a generally horizontal upper leg extending rearwardly from the bight and overlying the deck and a generally horizontal lower leg extending rearwardly from the bight to a lower portion of the rear wall, a brace is rigidly affixed to the rear wall and extends downwardly and forwardly to meet the lower leg, removable rear fasteners are provided between an upper rear portion of the deck and the upper leg and between the lower portion of the rear wall and the lower leg, and forward, separable connector means are provided between the upper leg and a forward portion of the deck and between the lower leg and a lower portion of the brace.

2. The invention defined in claim 1 in which each forward connector means includes a pin and slot connection.

3. The invention defined in claim 1 in which each stripper is symmetrical as to its upper and lower legs so as to be removable and reversible in position on the support and in stripping relation to the reel.

4. The invention defined in claim 1 in which each brace has downwardly and outwardly flaring sides respectively overhanging opposite fore-and-aft edge portions of the associated lower leg so as to guide the associated fingers laterally outwardly and clear of said lower leg.

References Cited

UNITED STATES PATENTS

| | | | |
|---|---|---|---|
| 2,524,233 | 10/1950 | Russell | 56—364 |
| 3,226,921 | 1/1966 | Shepley | 56—364 |
| 3,397,527 | 8/1968 | Luek et al. | 56—364 |

ANTONIO F. GUIDA, Primary Examiner